July 9, 1935.  J. A. JOHNSON  2,007,274
CAM MOTION
Filed May 3, 1933  2 Sheets-Sheet 1
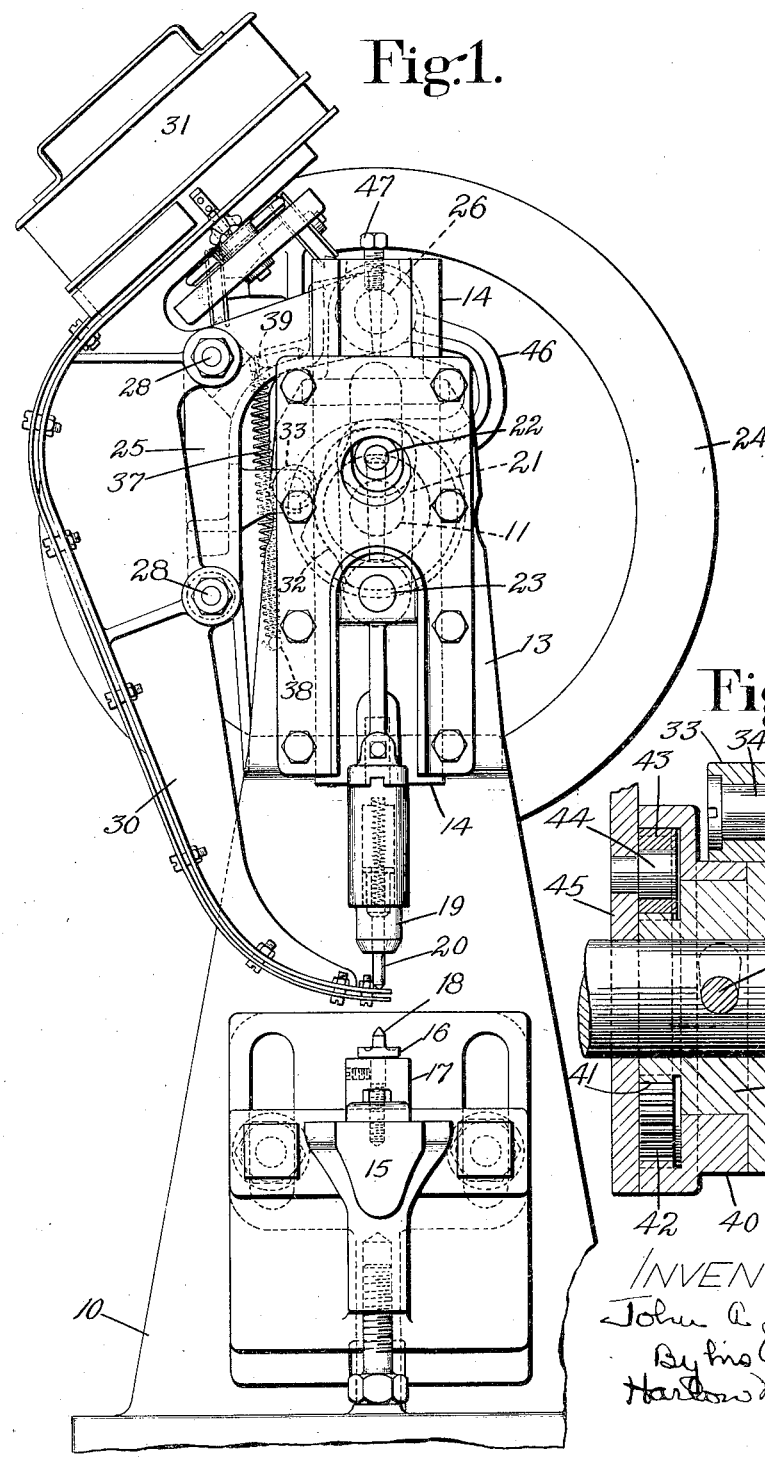
INVENTOR
John A. Johnson
By his Attorney
Harlow M. Davis July 9, 1935.  J. A. JOHNSON  2,007,274
CAM MOTION
Filed May 3, 1933   2 Sheets-Sheet 2
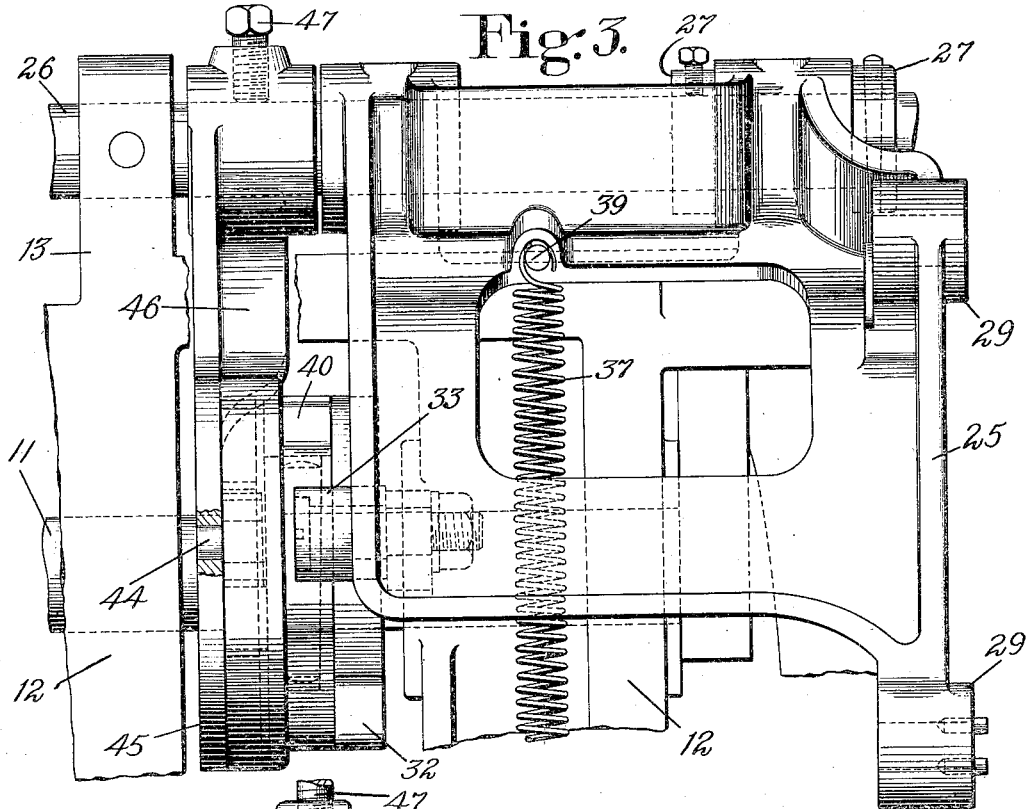
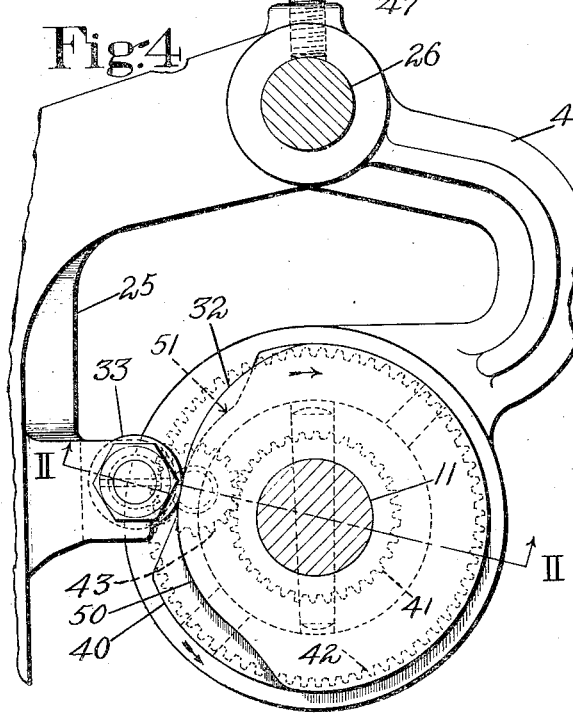
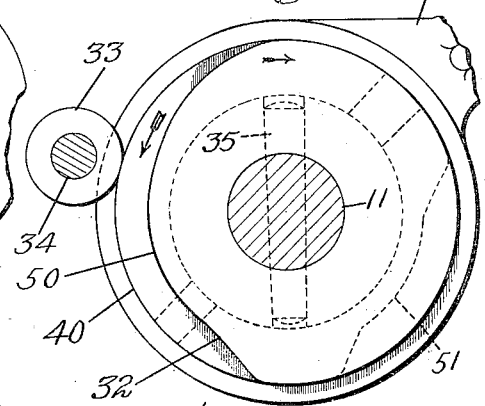
INVENTOR
John A. Johnson
By his Attorney,
Harlow M. Davis Patented July 9, 1935

2,007,274

UNITED STATES PATENT OFFICE 2,007,274

CAM-MOTION

John A. Johnson, Everett, Mass., assignor to United Shoe Machinery Corporation, Paterson, N. J., a corporation of New Jersey Application May 3, 1933, Serial No. 669,178

17 Claims. (Cl. 218—15)

This invention relates to cam-motions, its object being to provide improved means for periodically modifying the operation of a reciprocatory device that derives its motions in one direction only from a power-driven cam.

In certain complex machine organizations it is sometimes necessary or desirable to modify the operation of some device or mechanism in certain predetermined cycles of a cam without such modification in other cycles. For example, when certain types of fastener-inserting machines are used for inserting eyelets or grommets into heavy and tightly woven fabric one cyle of the fastener-inserting mechanism may be utilized to puncture the fabric without inserting any fastener, and another cycle may be utilized to insert a fastener into a hole formed in the puncturing cycle. Consequently, if the machine includes, as such machines commonly do, automatic mechanism for supplying the fasteners to the fastener-inserting mechanism, it is desirable to provide automatic means for modifying the normal operation of the fastener-supplying mechanism in the puncturing cycles by preventing delivery of a fastener in those cycles.

It has been proposed heretofore to equip certain fastener-inserting machines with latches arranged to prevent operation of fastener-supplying raceways while the fastener-inserting mechanisms are operating to puncture the fastener-receiving material, but, so far as I am aware, no such expedient has had provision for restoring its raceway automatically to operation. On the contrary, manual intervention has been required for the latter purpose. Consequently, because of their dependence upon manual tripping to restore the affected parts to regular operation such expedients have not been entirely satisfactory.

In view of this condition, and in accordance with the purpose stated above, the present invention is illustrated herein as embodied in a fully automatic mechanism that not only modifies the operation of a reciprocated device at regular intervals but also restores the device to normal operation after each modification of its operation, to the end that no manual intervention will be required to obtain either of these results.

In one aspect the invention consists in a combination with a reciprocatory device, for example, a fastener-supplying raceway, and a power-operated cam having an operating surface arranged to engage such device and thereby move it in one direction against an opposed yielding force, of an automatic power-operated modifier the cyclic rate of which bears a certain proportional relation to the cyclic rate of the operating cam, the modifier being arranged to modify the operation of the reciprocatory device in certain cycles of the operating cam but not in others.

As herein exemplified the modifier is constructed and arranged to be effective in a preventive manner, that is, by preventing certain movements of the device that would normally occur were it not for the intervention of the modifier, but in its broad aspect the invention is not limited to modification of a preventive character.

When, as herein illustrated, the invention is embodied in an organization adapted to utilize a rotary cam and a rotary modifier it may advantageously comprise other improved features of combination and arrangement. For example, the combination herein illustrated comprises a rotary driven cam provided with a driving gear, a relatively rotatable modifier provided with a driven gear, the modifier being mounted on and supported by the hub of the cam, transmission means arranged to transmit rotation from the driving gear to the driven gear, and a stationary support on which the transmission means is mounted in cooperative relation to the gears. Such a combination may, in many cases, readily be attached to outstanding machines not originally intended to include any means for modifying the operation of a reciprocatory device. In this light, an attachment of this type may broaden the field of utility and increase the efficiency of fastener-inserting machines of certain types by rendering them especially suitable for inserting fasteners into heavy woven fabric.

Referring to the drawings,

Fig. 1 is a front elevation of a fastener-inserting machine embodying the present invention;

Fig. 2 is a cross-sectional view through the cam for operating a fastener-supplying raceway and through the means for modifying the effect of the cam, see line II—II of Fig. 4;

Fig. 3 is an elevation of the left-hand side of the cam and modifier assemblage and includes an oscillatory carrier for supporting the fastener-supplying raceway;

Fig. 4 is a vertical sectional view including the cam and the modifier in front elevation, the modifier being in a non-effective position and the position of the cam corresponding to the fastener-presenting position of the raceway; and Fig. 5 represents a different relation of the cam and the modifier in which the latter is effective to prevent the normal operation of the raceway according to the design of the cam, the direction of the view being the same as that of Fig. 4.

The general organization of the illustrated machine is similar to that of the machine illustrated in United States Letters Patent No. 427,557, granted May 13, 1890, on application of H. H. Cummings, although the patented machine includes work-feeding mechanism and certain other elements not required for the purposes of the machine herein illustrated. However, as shown in said Letters Patent, the frame 10 is provided with a horizontal cam-shaft 11 arranged in bearings 12 and is also provided with an overhanging arm 13 in which guideways are formed for a vertically movable slide 14. A fixed horn or tool-support 15 projects forwardly from the frame 10 to a point under the slide 14 where a fastener-clenching tool or anvil 16 is mounted on a block 17. The tool 16 is formed with a pointed central projection 18 the base of which is surrounded by an annular groove or surface adapted to upset and clench the barrels of eyelets or grommets. The pointed projection 18 is adapted to pierce holes in the materials, such as heavy fabrics, prior to the insertion of the barrels of the eyelets or grommets. The slide 14 carries a fastener-inserting tool 19 of well-known construction including a central spring-pressed spindle 20 adapted to pick an eyelet or grommet from a raceway and transfer it to the clenching tool 16. A link 21 connects the slide 14 with a crank-pin 22 carried by the shaft 11, the connection between the link and the slide being formed by a pivot-pin 23.

A pulley 24, which also serves as a flywheel, is loosely mounted on the shaft 11, and may be driven by a belt. The pulley and the shaft are provided with a suitable starting-and-stopping mechanism (not shown) to put the shaft 11 into rotation and to stop its rotation when the crank-pin 22 is at or near top center.

The illustrated machine is also provided with a reciprocatory device consisting of a frame 25 for operating a fastener-supplying unit. The frame 25 is pivotally mounted on a cylindrical rod or bar 26 affixed to the arm 13 above and parallel to the shaft 11. Collars 27 (Fig. 3) are arranged on the rod 26 to prevent the frame 25 from sliding lengthwise of the rod. Bolts or studs 28 extend through bosses 29 formed on the frame 25 to secure a detachable fastener-supplying unit comprising a raceway 30 and a hopper 31. The delivery end of the raceway is arranged to present fasteners to the spindle 20 in alternate cycles of the shaft 11 when the slide 14 is at or near its highest position, but is retracted from the path of the inserting tool 19 during the downward strokes thereof. For this purpose, the shaft 11 is provided with a cam 32 the periphery of which is arranged to operate against a roll 33 carried by the frame 25 and connected thereto by a stud 34. A pin 35 extends through the hub 36 of the cam and through the shaft 11 to secure the cam rigidly to the shaft. The delivery end of the raceway is normally moved to its fastener-presenting position by a tension spring 37, the lower end of which (Fig. 1) is attached to an anchoring pin 38 and the upper end to a pin 39 carried by the frame 25.

Since the cam 32 and the crank-pin 22 are both rigidly related to the shaft 11 the normal and usual mode of operation would result in presenting a fastener to the spindle 20 in each cycle of the shaft, but for certain purposes, as when using the machine to insert grommets in the heavier grades of woven fabric such as duck and canvas, it is desirable to impale the fastener-receiving material on the pointed projection 18 prior to the cycle in which a fastener is taken from the raceway by the spindle. Accordingly, the novel mechanism hereinafter described is provided to modify the operation of the fastener-supplying unit by rendering the cam ineffectual in alternate cycles of its rotation so that in these cycles the fastener-inserting tool 19 may be utilized solely for the purpose of impaling the fastener-receiving material upon the pointed projection 18 to prepare a hole for the reception of a fastener.

To this end, a rotary modifier 40 is cooperatively related to the cam 32 and is preferably mounted on the hub 36 of the cam as shown in Fig. 2. Moreover, the cam-roll 33 laps the periphery of the modifier as well as that of the cam, but when, as in the example herein disclosed, the operating conditions are such as to call for non-operation of the fastener-supplying device in alternate cycles of the cam the desired result may be obtained by rotating the modifier 40 at a cyclic rate one-half as rapid as that of the cam. Accordingly, as herein illustrated, the hub 36 of the cam is provided with a spur-gear having external teeth 41 while the modifier 40 is provided with an internal gear 42, the diameter of which is twice as great as that of the gear 41. Rotation is transmitted from the gear 41 to the gear 42 by an intermediate pinion 43 freely rotatable upon a fixed stud 44. This stud projects from a circular plate 45 into the annular chamber formed by the gears 41 and 42, while the plate 45 constitutes a closure for one end of said chamber. A central hole is formed in the circular plate 45 to enable the shaft 11 to extend therethrough, the wall of the hole having a bearing on the shaft whereby the pinion 43 is maintained rigidly at the desired distance from the axis of the shaft. As shown in Figs. 1, 3 and 4, the plate 45 is provided with an arm 46 through which the stationary rod 26 extends, the plate being thus prevented from turning about the axis of the shaft 11. A set-screw 47 in the arm 46 is arranged to engage the rod 26 to secure the plate 45 against sliding lengthwise of the shaft.

It will now be understood that the speed-reducing gearing 41, 42, 43 will cause the modifier 40 to execute one complete cycle of rotation while the cam 32 is executing two complete cycles, and that the low portion 50 of the cam (Fig. 5) will be ineffectual in alternate cycles when a high portion of the modifier is running on the cam-roll. It will also be understood that the low portion 50 of the cam will be effectual only when the low portion 51 of the modifier is passing the cam-roll as represented in Fig. 4. In operation, the low portion 50 of the cam and the lower portion 51 of the modifier both pass the roll 33 at the same time once in each two cycles of rotation of the cam, thus permitting the spring 37 to move the delivery end of the raceway to its fastener-presenting position as shown in Fig. 1. The positions of the cam and the modifier under these conditions are shown in Fig. 4. Although the cam occupies the same position in Fig. 5 as in Fig. 4, the position of the modifier is 180 degrees from the position shown in Fig. 4. Therefore, Fig. 5 represents the initial conditions under which a work-piece will be presented to the machine for the insertion of a grommet.

Assuming that the roll 33 is held initially away from the low portion 50 of the cam by the high portion of the modifier as shown in Fig. 5, the delivery end of the raceway will be initially retracted from the position represented in Fig. 1.

If, now, the operator places an article of work on the pointed projection 18 and depresses a clutch-controlling treadle (not shown) through a period that will insure two cycles of rotation of the shaft 11, the machine will operate as follows. The fastener-inserting tool 19 will descend without having any grommet on its spindle 20 and will force the grommet-receiving material down to the level surface of the clenching tool 16, the pointed projection 18 being thereby forced through the material and into the bore of the tool 19. The latter tool will immediately rise, leaving the material on the projection 18. During this cycle of the shaft 11, the modifier 40 will rotate through 180 degrees from the position shown in Fig. 5 to that shown in Fig. 4, its low portion 51 being thereby brought to a point that will enable the cam-roll 33 to roll on the low portion 50 of the cam. The delivery end of the raceway will therefore move to its fastener-presenting position (Fig. 1) under the influence of the spring 37. As the second cycle of the shaft begins the spindle 20 enters the barrel of the grommet then supported in alinement with it, and the operation proceeds in the usual manner, the cam 32 being effective at this stage to retract the delivery end of the raceway in time to clear the tool 19, the barrel of the detached grommet being inserted through the material previously pierced by the projection 18, and the lower end of the barrel of the grommet being upset and clenched by the annular groove or surface in the tool 16. During the latter half of the second cycle of the shaft 11 the low portion 50 of the cam is again brought to the position shown in Fig. 5, but at this stage the high portion of the modifier 40 becomes effective again to maintain the delivery end of the raceway in its retracted position, to the end that once more the inserting tool 19 may not receive a grommet until the third stroke of its next four-stroke cycle of operation. From the foregoing it will be understood that the modifier 40 engages and disengages the roll 33 periodically with the result that in alternate cycles of rotation of the cam 32 the roll 33 is controlled by the modifier, whereas in the other cycles the modifier relinquishes its control to permit the roll to operate in the normal manner according to the design of the cam.

Having thus described my invention, what I claim as new and desire to secure by Letters Patent of the United States is:

1. The combination with a reciprocatory device and a power-operated cam having an operating surface arranged to engage said device and thereby move it in one direction against an opposed yielding force, of an automatic power-operated modifier the cyclic rate of which is different from that of said cam, the modifier being arranged to modify the operation of said device in certain cycles of the cam but not in others.

2. The combination with a reciprocatory device and a power-operated cam having an operating surface for moving said device in one direction against an opposed yielding force, of a power-operated modifier driven at a cyclic rate different from that of said cam, the modifier being arranged to engage and disengage said device periodically to modify its operation in certain cycles of said cam but not in others.

3. The combination with a reciprocatory device and a rotary power-operated cam a surface of which is arranged to move said device in one direction against an opposed yielding force, of a rotary modifier having a surface formed and arranged to engage and disengage said device periodically, and means arranged to drive said modifier at a cyclic rate different from that of said cam.

4. The combination with a reciprocatory device and a rotary power-operated cam a surface of which is arranged to move said device in one direction against an opposed yielding force, of a rotary modifier having an operating surface arranged to engage and disengage said device periodically, and reducing gearing by which rotation is transmitted from said cam to said modifier.

5. The combination with a reciprocatory device and a rotary power-operated cam a surface of which is arranged to move said device in one direction against an opposed yielding force, of a rotary modifier coaxially related to said cam and having an operating surface formed and arranged to engage and disengage said device periodically, and means arranged to drive said modifier at a cyclic rate different from that of said cam.

6. The combination with a reciprocatory device normally moved in one direction by a yielding force, of a rotary cam and a rotary modifier coaxially related and having peripheral operating surfaces both arranged to act on said device in opposition to said yielding force, and means by which said cam and said modifier are driven at different cyclic rates.

7. The combination with a reciprocatory device normally moved in one direction by a yielding force, of a rotary cam provided with a gear, a rotary modifier coaxially related to said cam and provided with a gear, means arranged to transmit rotation from one of said gears to the other, and a stationary support by which said transmission means is maintained in coöperative relation to said gears, said cam and said modifier hving operating surfaces both arranged to act on said device in opposition to said yielding force.

8. The combination with a reciprocatory device normally moved in one direction by a yielding force, of a rotary driven cam provided with a hub and with an external spur-gear, a rotary modifier arranged on said hub and provided with an internal spur-gear larger than said external gear, an intermediate gear arranged to transmit rotation from said external gear to said internal gear, and a stationary support by which said intermediate gear is maintained in coöperative relation to the other said gears, said cam and said modifier having operating surfaces both arranged to act on said device in opposition to said yielding force.

9. In a machine for inserting fasteners, automatic fastener-inserting mechanism, a reciprocatory fastener supplying device spring-stressed in one direction to present fasteners to said mechanism, a power-operated cam arranged to retract said device, and power-operated mechanism arranged to restrain said device in a retracted position during alternate cycles of said cam and to release said device for normal operation during the other cycles of the cam.

10. In a machine for inserting fasteners, automatic fastener-inserting mechanism, a reciprocatory fastener-supplying device spring-stressed in one direction to present fasteners to said mechanism, a rotary power-operated cam arranged to retract said device, and power-operated mechanism including a rotary modifier the rotational rate of which is one-half that of said cam, the modifier being arranged to modify the operation of said device in alternate cycles of said cam but not in the other cycles.

11. In a machine for inserting fasteners, automatic fastener-inserting mechanism, a reciprocatory fastener-supplying device spring-stressed in one direction to present fasteners to said mechanism, a rotary power-operated cam arranged to retract said device, a rotary modifier, and means arranged to drive said modifier at a speed one-half as great as the speed of said cam, said modifier being arranged to modify the operation of said device in alternate cycles of said cam but not in the other cycles.

12. In a machine for inserting fasteners, automatic fastener-inserting mechanism, a reciprocatory fastener-supplying device spring-stressed in one direction to present fasteners to said mechanism, a rotary power-operated cam arranged to retract said device, a rotary modifier in contiguous and coaxial relation to said cam, and mechanism arranged to drive said modifier at a rate different from that of said cam, said modifier being formed and arranged to restrain said device during alternate cycles of said cam but not during the other cycles.

13. In a machine for inserting fasteners, automatic fastener-inserting mechanism, a reciprocatory raceway spring-stressed in one direction to present fasteners to said mechanism, a cam and a modifier relatively rotatable about a common axis, the one to retract said raceway and the other to restrain the raceway in a retracted position, and mechanism by which said cam and said modifier are operated at unequal speeds such as to prevent operation of said raceway in alternate cycles of said cam.

14. In a machine provided with a reciprocatory device normally moved in one direction by the force of a spring, an operating mechanism comprising a rotary power-operated cam having a hub and a driving gear at one end thereof, a relatively rotatable annular modifier arranged on said hub and having an internal gear surrounding said driving gear, said gears forming an annular chamber, a transmission gear arranged in said chamber and cooperating with said gears, and a stationary support arranged to close one end of said chamber, said transmission gear being rotatably mounted on said support.

15. In a machine provided with a rotary driven shaft and a reciprocatory device normally moved in one direction by a yielding force, an operating mechanism comprising two relatively rotatable members one of which is nested in the other and carried by said shaft, and gearing arranged to transmit rotation from said shaft to the outer one of said members, with a reduction in angular speed, one of said members having a cam surface arranged to operate said device, and the other member having an operating surface arranged to modify the operation of said device in certain cycles of said cam member but not in others.

16. A cam-motion for operating a reciprocatory device against an opposed yielding force, comprising a rotary cam and a relatively rotatable modifier formed to be nested one in the other and having operating surfaces arranged to function side by side, a driving gear and a driven gear carried one by said cam and the other by said modifier, transmission means for communicating rotation from said driving gear to said driven gear, and a stationary support for maintaining said transmission means in coöperative relation to said gears.

17. A cam-motion for operating a reciprocatory device against an opposed yielding force, comprising a cam and a modifier arranged side by side and relatively rotatable about a common axis, the cam and the modifier having peripheral operating surfaces each arranged to engage and disengage said device periodically, and means by which said cam and said modifier are rotated at unequal speeds to produce a differential operation of said device.

JOHN A. JOHNSON.